W. O. PLATT.
ENDLESS SICKLE.
APPLICATION FILED MAR. 19, 1913.
1,200,520.
Patented Oct. 10, 1916.
2 SHEETS—SHEET 1.
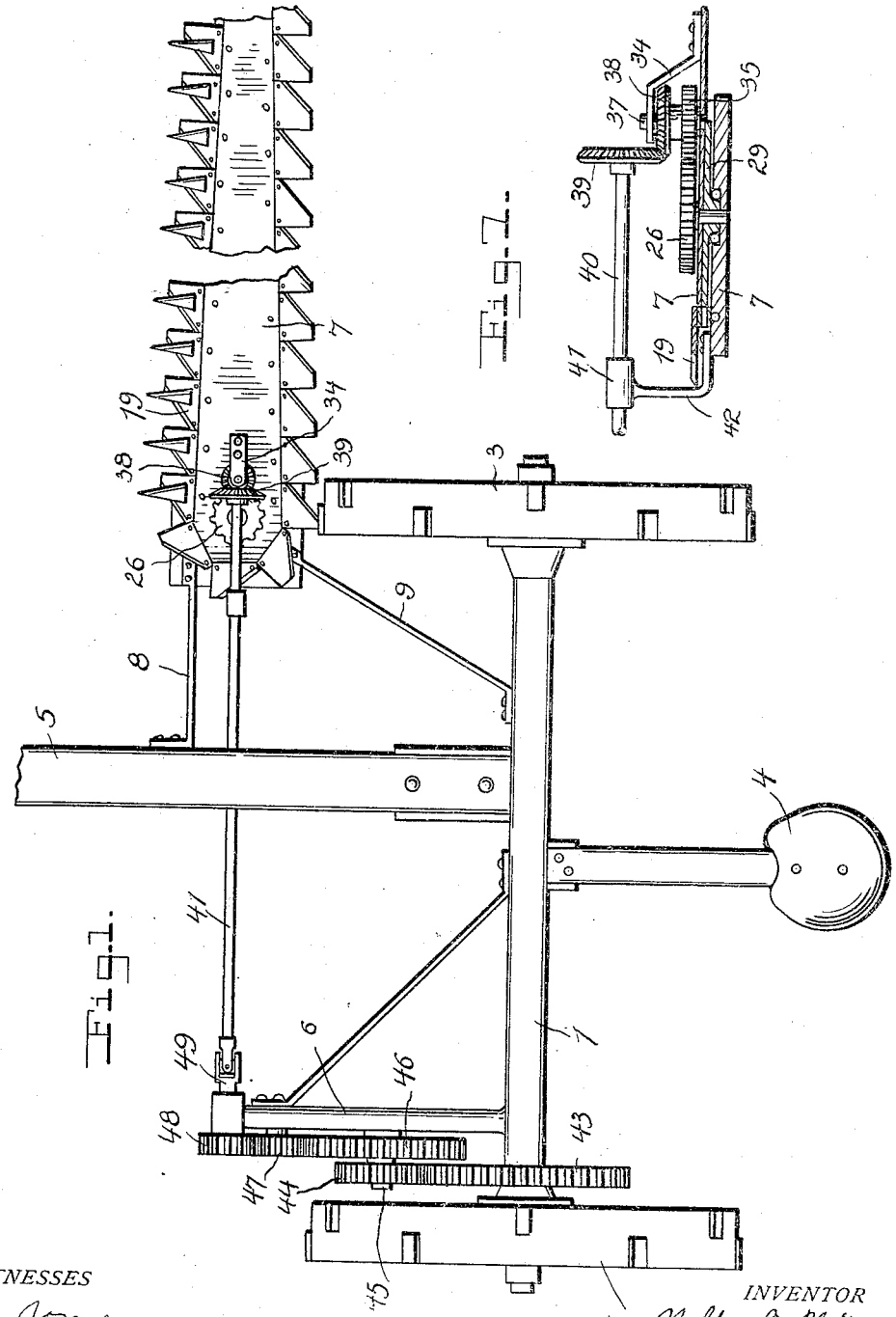
WITNESSES
INVENTOR

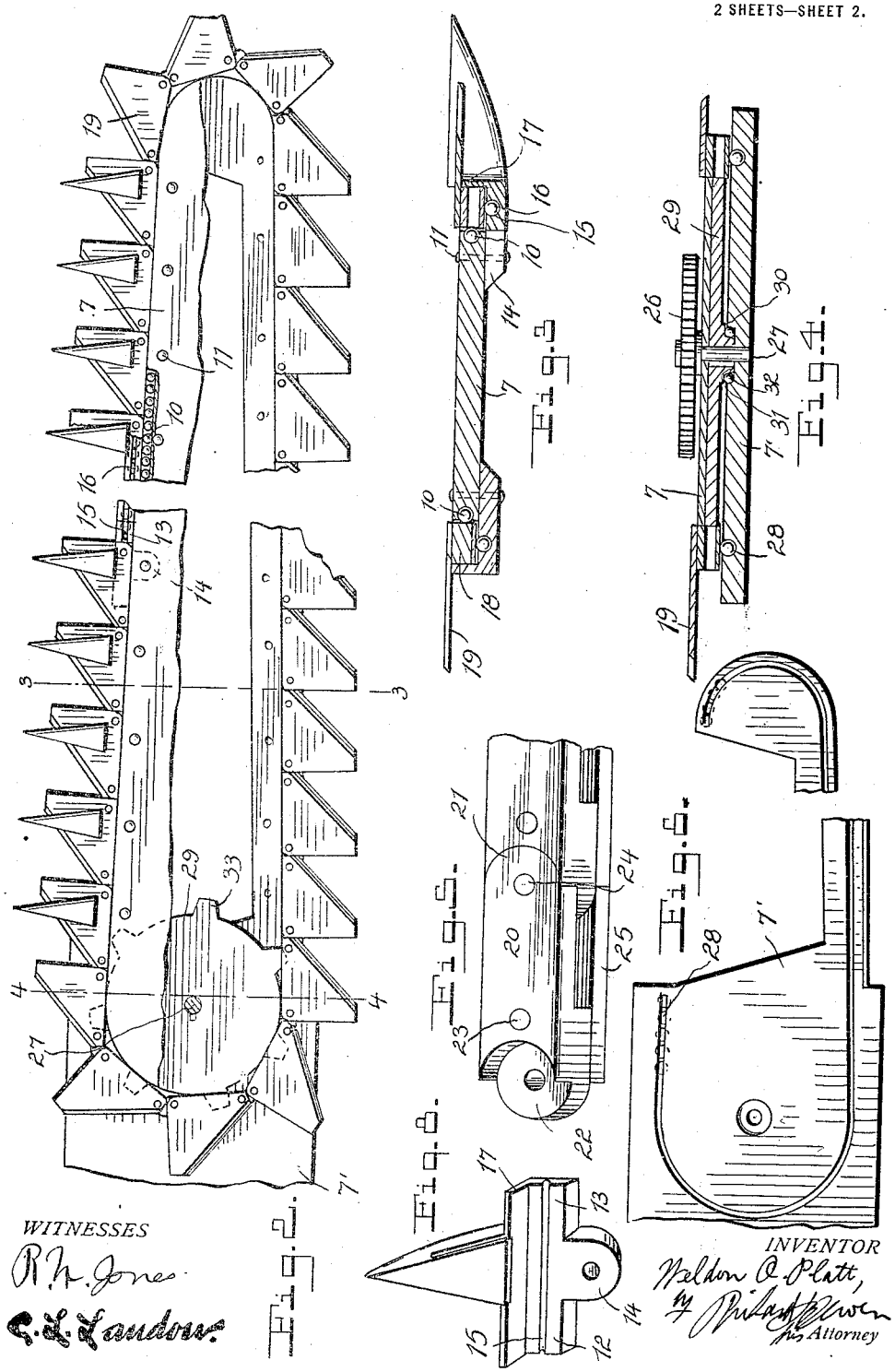

UNITED STATES PATENT OFFICE.

WELDON O. PLATT, OF PLEASANT HOPE, MISSOURI.

ENDLESS SICKLE.

1,200,520.   Specification of Letters Patent.   Patented Oct. 10, 1916.

Application filed March 19, 1913. Serial No. 755,435.

*To all whom it may concern:*

Be it known that I, WELDON O. PLATT, a citizen of the United States, residing at Pleasant Hope, in the county of Polk and State of Missouri, have invented new and useful Improvements in Endless Sickles, of which the following is a specification.

This invention relates to mowing machines and the like, and refers particularly to improved construction in sickle bars used in connection with such machine.

The principal object of my invention contemplates the construction of an endless sickle bar so formed that a continuous, even draft, is effected relative to the movement of the mowing machine.

This invention further comprehends the provision of a sickle bar which will be one effective in its operation and more durable by reason of the fact that the structure will not be subject to the same pounding and consequent wear noticeable in all cutter bars of the reciprocating type.

The above and additional objects are accomplished by such means as are illustrated in their preferred embodiment in the accompanying drawings described in the following specification, and then more particularly pointed out in the claim which is appended hereto and forms a part of this application.

With reference to the several views of the drawings throughout which similar reference numerals designate corresponding parts and wherein the general embodiment of the several parts of my invention is illustrated, Figure 1 is a top plan view of a mowing machine equipped with my invention. Fig. 2 is a top plan view of the cutting mechanism with parts of the structure broken away to more clearly disclose the assembled relation of the various elements. Fig. 3 is a section taken on the line 3—3 of Fig. 2. Fig. 4 is a section on the line 4—4 of Fig. 2. Fig. 5 is a detail perspective view disclosing the peculiar means employed to bind the knives into an endless belt. Fig. 6 is a top plan view of the finger bar illustrating in detail the ball bearing race way. Fig. 7 is a side elevation with the finger bar and knife belt shown in section, illustrating the gear wheels which communicate the motive power from the machine to the cutter bar. Fig. 8 is a detail perspective of a guard member in disassembled relation.

Proceeding now to the description of the drawings, I have illustrated my invention as used in connection with a mower of improved structure. While the mower structure proper forms no part of my invention I present the following brief description, merely to disclose more clearly the operation of my endless cutter. The mower includes the customary axle 1, wheels 2 and 3, seat 4, draft tongue 5 and the supporting bars 6.

My invention includes two main elements, the cutter attachment and the driving mechanism therefor.

The cutting mechanism includes the finger bar 7 mounted in the desired relation to the mower frame by the brace arms 8 and 9. A pair of metal plates may be secured to either face of the bar for the purpose of protection against ground engagement with rocks and other foreign material. The cutter bar is rounded at each end, the inner end being of greater cross section dimension than the outer one for a purpose to be hereinafter disclosed. A circumferential ball race is arranged in the edges of the cutter bar for the reception of the ball bearings 10. The forward edge of the cutter bar carries a plurality of spaced guard fingers which may be bolted as at 11 or otherwise secured to the bars in any suitable manner. These finger members are provided with the customary knife slots and the lower convex ground engaging faces. The finger members of my invention differ from the customary guards however, in this respect; whereas the ordinary guard carries merely an extended securing lug at its inner end I have provided the guards of my invention with the lateral extensions 12 and 13 formed integrally with the guard and projecting from the lower portion thereof. A perforated ear 14 corresponding to the customary securing lugs is carried by the lateral bar formed by the members 12 and 13. This bar above described is equipped with the ball race 15 wherein are seated the balls 16. It will be seen that by securing the guard member to the finger bar in such manner as to abut the ends of the members 12 and 13 of each guard, that a continuous ball race will be formed and that a circumferentially extending pocket will be provided by the spacing of the walls 17 of the guard member from the edge of the finger bar 7. Furthermore, the abutment of the proximate ends of said lateral bars, retains the fingers in equidistantly spaced relation.

Operating in the above described pocket is the endless chain 18 to which are secured the several knives 19. This chain is formed of a series of pivotally connected links, each link including two elements. The first of these elements designated in the drawings by the numeral 20 is a metallic plate, the end 21 of which is rounded for a purpose hereinafter disclosed and the other end of which is cut away to form a concave semi-circular end face. Adjacent the concave end, this plate 20 carries an enlarged under portion, the lower face of which is parallel with the upper face of the plates. A centrally perforated ear 22 is carried forwardly of this enlarged portion and corresponds in thickness thereto. The plate 20 is formed with the bolt receiving bores 23 and 24.

The second of the chain elements consists of a plate substantially similar in construction and having the same assembled relation as the plate 20, being provided however with no enlarged portion or circular ear. It will be readily seen that by alternately inverting the members 20 and securing them in this relation to the plates 25 by means of the bolts 23 and 24, a chain will be formed consisting of a series of pivotally connected links. From the disclosures in the drawings the manner in which the bolts 24 and 23 are employed to secure the several knives to the separate links of the chain will be readily understood.

Having thus fully described the construction and arrangement of the several parts of the cutting mechanism, I now pass to the description of the means employed in actuating the knife chain in its passage around the finger bar. This structure includes an actuating wheel 26 which is keyed to the shaft 27, the latter member being journaled in the finger bar 7. The finger bar is cut away on the upper face at the enlarged end to provide the table indicated in Fig. 4 by the numeral 7'. A semi-circular ball race is formed in this table member to receive the bearings 28 which are disposed to engage the plates 25 of the chain during the rotation of this member. A spur wheel 29 is keyed to the shaft 27 and is provided with a centrally disposed annular shoulder and bearing stud 30 and 31 respectively. The member 7' has a circular recess formed in its center to receive the stud 31 and to provide a ball race for the bearings 32 which are disposed for engagement with the shoulders 31 of the member 29. The member 29 carries a plurality of spaced spurs 33 which are arranged for recurring engagement with the vertical wall of the enlarged portions of the members 20.

The finger bar carries an angular brace 34 disposed to coöperate with a bore in the upper face of the finger bar in holding the gear wheel 35 in engagement with the wheel 26. The shaft 37 to which the member 35 is keyed also carries a fixedly mounted beveled gear 38 which is mounted for engagement with the beveled gear 39 carried terminally on the driving shaft 40. This shaft 40 is journaled in the sleeve 41 of the brace 42 which is bolted or otherwise secured to the member 7'. The shaft 41 is operatively connected to the axle 1 through the medium of the spur wheels 43, 44, stub shaft 45, spur wheels 46, 47, 48 and stub shaft 49. The above enumerated connections are operatively mounted as illustrated in the drawings on the frame of the mower proper.

The preferred construction and assembled relation of the various parts of my invention being clearly disclosed in the above description the following explanation of the operation of my device is next in order: As the mower is drawn over the ground the chain 18 is actuated by the revolution of the wheel 29 and the subsequent engagement of the members 33 with the vertical walls of the enlarged portion of the plate 20. As a result of the rotation of the chain around the finger bar, the knives 19 are sequentially drawn through the slots of the guard members thus cutting the herbage.

I wish to direct particular attention to the fact that frictional engagement of the moving parts of the device is greatly eliminated through the construction of the several parts in such manner as to permit the utilization of ball bearing tracks.

It will of course be understood that the above description and accompanying drawings comprehend only the general and preferred embodiment of my invention and that in reduction to practice various minor changes found necessary in the details of construction and arrangement of the several parts may be readily made within the scope of the appended claim and without sacrificing any of the advantages of this invention.

What is claimed is:

In a mowing machine; a sickle table, a plurality of fingers, each having a laterally projecting portion substantially L-shaped when viewed in cross section, each L-shaped portion having a groove formed in the upper face of its horizontal portion, said groove being open at each end, means to secure said L-shaped portions to said table, said L-shaped portions forming a channel about the marginal edge of the said table, an endless carrier operating in said channel, knife blades carried by said carrier overlying and cooperating with said fingers during movement of said carrier, anti-friction means on the marginal edge of said table engaged by said carrier, the grooves in said L-shaped portions adapted to register when said fingers are in assembled relation to provide a continuous race-way beneath said carrier, and ball bearings in said race-way engaged by said carrier, as and for the purpose specified.

WELDON O. PLATT.

Witnesses:
O. S. CASIN,
B. E. MAYFIELD.

Copies of this patent may be obtained for five cents each, by addressing the "Commissioner of Patents, Washington, D. C."